April 30, 1946.  W. A. PATRICK, JR., ET AL  2,399,247
DEHYDRATING APPARATUS
Filed March 10, 1943   3 Sheets-Sheet 3

Inventors:
Walter H. Patrick, Jr.,
John D. Elder,
By Cushman Darby & Cushman
Attorneys.

Patented Apr. 30, 1946

2,399,247

UNITED STATES PATENT OFFICE 2,399,247

DEHYDRATING APPARATUS

Walter A. Patrick, Jr., and John D. Elder, Baltimore, Md.; said Elder assignor to Crown Cork & Seal Company, Inc., Baltimore, Md., a corporation of New York Application March 10, 1943, Serial No. 478,734

3 Claims. (Cl. 159—11)

This invention relates to an apparatus for the dehydration of materials, particularly solutions, to any desired degree up to substantially complete dryness.

In the preferred practice of the invention we employ the principles disclosed in the copending application of Walter A. Patrick, Jr. Ser. No. 448,874, and the copending application of the said Patrick and John D. Elder, Ser. No. 448,875, both filed June 27, 1942. According to both of these applications the heat generated in a desiccant is transferred to an evaporating zone so that the desiccant is kept cool and an above freezing temperature is maintained in the evaporating zone. A particular feature of the joint application is the subjection of the fluid material to reduced pressure with the material in the form of a film, thereby greatly increasing the speed of evaporation.

During the initial stages of dehydration, i. e., while the solution, for example, blood, is in a ready flowing state, no difficulties of operation are presented in the film-forming procedure. However, as the viscosity of the solution increases, the film builds up in thickness and a skin, due to surface evaporation, forms both on the film and on the pool or batch from which the film is derived. This film prevents the escape of underlying vapors, as is evidenced by the formation of blisters. In our above mentioned joint application we have disclosed the use of scraping means for preventing the building up of the film, but this means is not entirely satisfactory since it itself tends to collect the material. A main purpose of the present invention is to provide method and means for breaking the surface skin and at the same time preventing undesirable film accretion. How this object is accomplished will be described with reference to the apparatus shown by way of example in the accompanying drawings in which:

Figure 1:
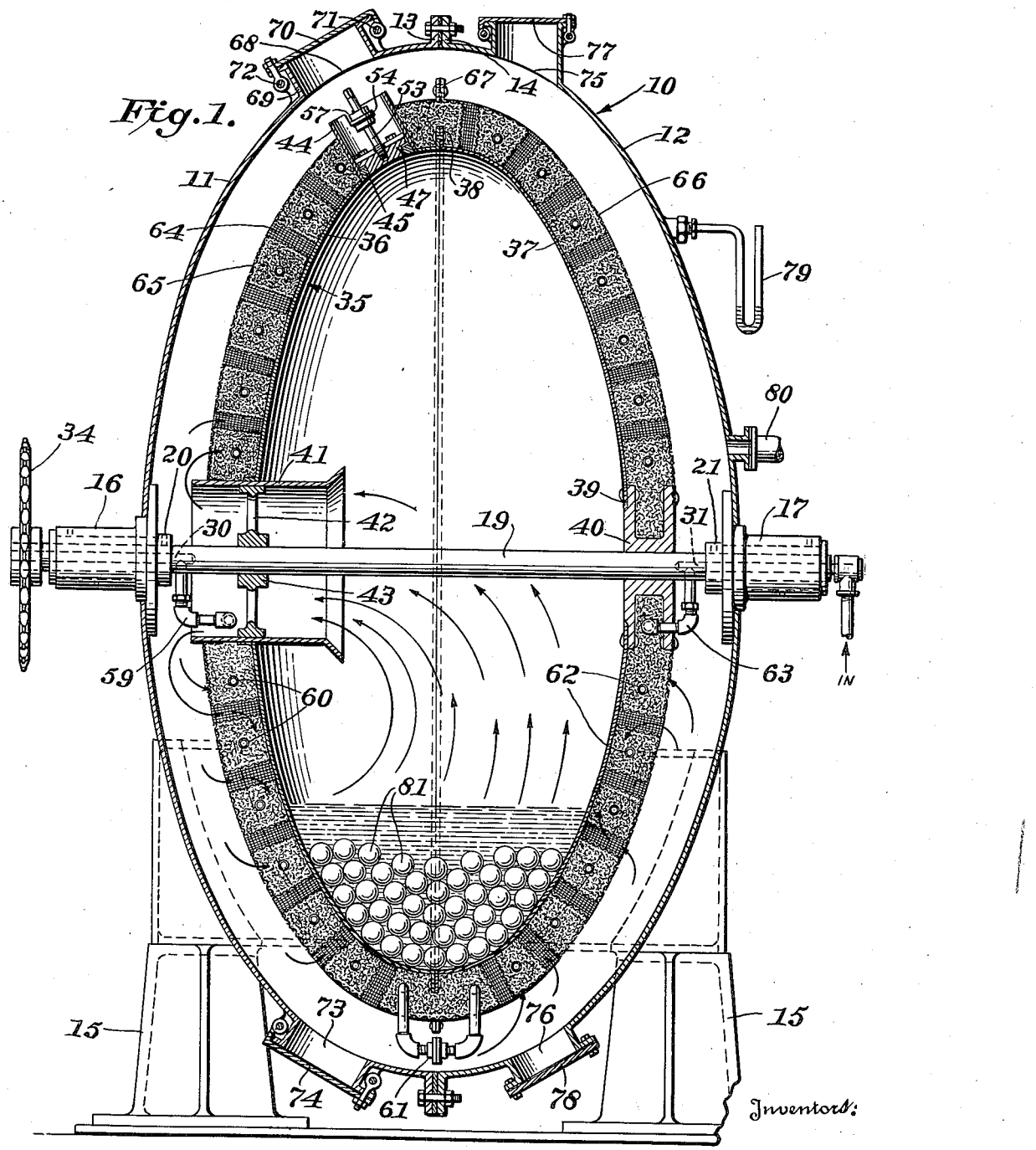
Figure 1 is a vertical axial section of the new apparatus.

Referring to the drawings, reference numeral 10 designates a casing of double convex form comprising two convex metal shells 11 and 12 provided with peripheral flanges 13 and 14 which are removably bolted together, a gasket being interposed between the two flanges in order to provide a fluid-tight joint. The casing is supported in any suitable manner, as by standards 15, with its minor axis disposed horizontally. On this axis the casing walls are provided with openings in which are bolted bearings 16 and 17 in a manner to form fluid-tight joints with the casing walls. Journaled in bearings 16 and 17 through the intermediary of bushings as at 18, Figure 4, is a shaft 19 which is maintained against axial displacement by collars 20 and 21, Figures 1 and 4, which also serve to hold the bushings against inward displacement.

Figure 4:
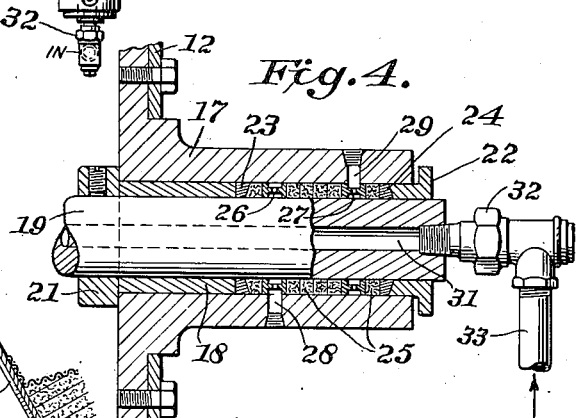
Figure 4 is an axial section on an enlarged scale of a bearing which appears in the preceding figures.
Figure 5:
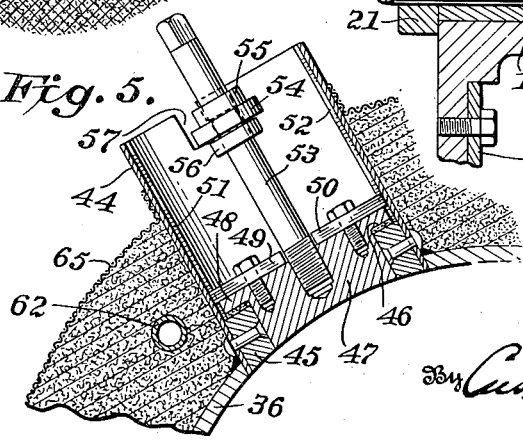
Figure 5 is an enlargement of parts appearing at the upper left of Figure 1.

Referring to Figure 4, a gland ring 22 is bolted to the outer end of bearing 17 for axial adjustment and interposed between this ring and the bushing 18 is a packing comprising metal rings 23 and 24 and a number of fiber rings 25 with interposed lantern glands 26 and 27. A radial bore 28 is provided in the bearing 17 in communication with the gland 26 and is adapted to be connected to a vacuum pump, while a radial bore 29 in communication with gland 27 is adapted to be connected to an oil seal supply. In this manner a fluid-tight packing is provided between bearing 17 and shaft 19 and a similar packing is provided between the shaft and bearing 16.

Figure 3:
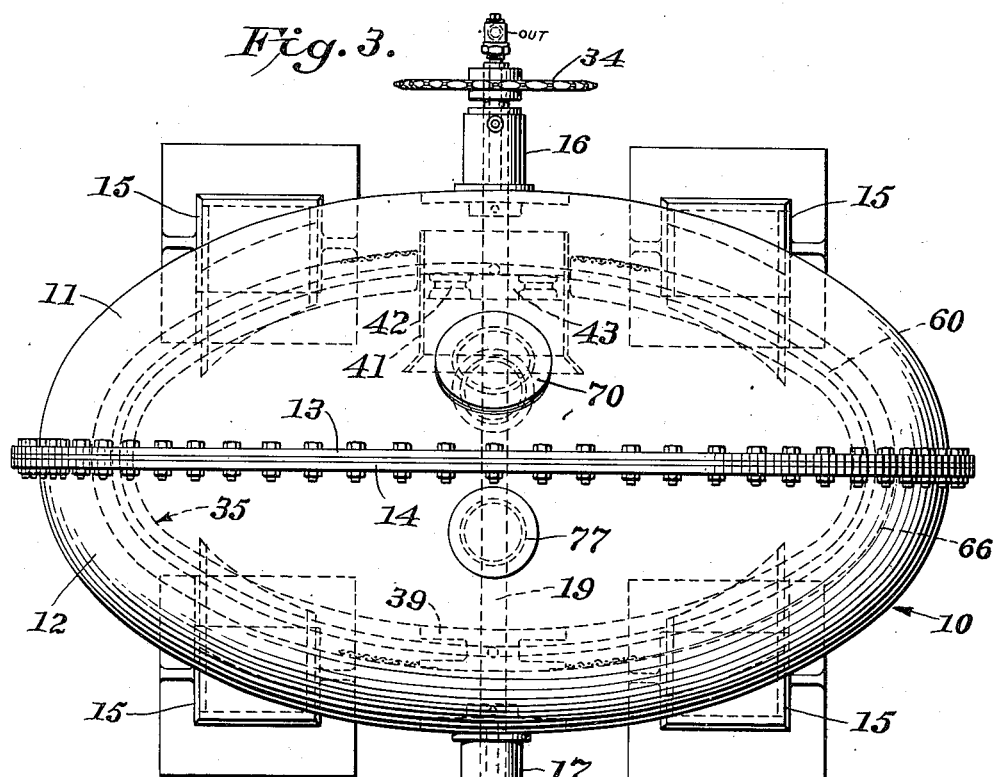
Figure 3 is a plan view of the apparatus.
Figure 6:
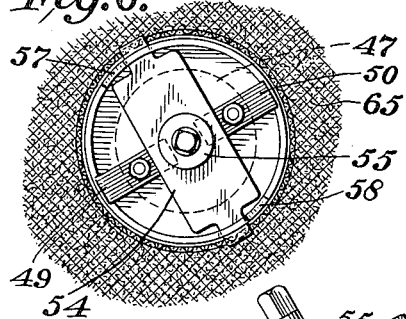
Figure 6 is a plan view of the devices of Figure 5.

The shaft ends project outwardly of the bearings and are provided with axial bores 30 and 31 which extend to points within the casing. Connected into the bore 31 by means of a swivel fitting 32 is a supply line 33 for steam or other heating medium. In Figure 3 a similar outlet fitting is shown in connection with bore 30. Fixed on an end of the shaft is a sprocket or the like 34 to which drive means may be connected for the rotation of the shaft.

Reference numeral 35 designates generally a drum which, like the casing 10, is of double convex form and comprises two convex metal shells 36 and 37 united and sealed through peripheral flanges as at 38. The drum, while similar in form to the casing, is substantially smaller than the latter so as to be symmetrically receivable within the casing with substantial spacing throughout. The portion 37 of the drum has an axial opening in which is secured, with a fluid-tight fit, a flange portion 39 of a double flanged hub 40 which is fixed on shaft 19. Portion 36 of the drum has a central opening in which is fixed a coaxial tubular member 41 secured to the rim of a spoked wheel 42 whose hub 43 is fixed on shaft 19. The inner end of member 41 is preferably flared as shown.

Adjacent its top, drum portion 36 is provided with a circular opening in which is secured and sealed as by welding, a projecting cylindrical neck 44 within the lower portion of which is fixed a ring 45 providing a top annular shoulder 46 supporting an annular gasket. Reference numeral 47 designates a plug having a portion fitting closely within ring 45 and surmounted by an annular shoulder portion 48 adapted to seat against the gasket on shoulder 46. Radially projecting lugs 49 and 50 are fixed on top of plug 47 with their outer ends slidable in axially extending grooves 51 and 52 in neck 44. Thus the plug, while removable from the neck, will always occupy the same angular relationship to the axis of the neck when operatively positioned to close ring 45. The inner end of the ring and of plug 47 are conformed to the curvature of the drum portion 36 so as not to interrupt the smooth continuity of the interior drum walls. Plug 47 has at its top a threaded axial bore in which is engaged the threaded end of a pin 53 which is rotatable in a central opening in a bar 54 and is maintained in association with the bar by means of fixed collars 55 and 56. The top edge of neck 44 is provided with diametrically opposite bayonet slots 57 and 58 in which are engageable the reduced ends of bar 54. When the bar is engaged in the slots the pin 53 may be rotated in the unthreading direction to firmly seat the plug.

A connection 59 is led from a radial bore in connection with shaft bore 30 to a convexed helical coil 60 arranged outwardly of drum portion 36 and connected through a coupling 61 to a similar coil 62 arranged outwardly of drum portion 37 with its inner end in communication with shaft bore 31 through a connection 63. Between the convolutions of the coils numerous hollow cylindrical members 64 of wire mesh are secured, as by soldering or welding, against the outer drum surface in substantially normal relation thereto and disposed around the convolutions and members 64 is a body of suitable desiccant, for example, silica gel, which is retained in position by screen portions 65 and 66 which follow the contours of the drum portions 36 and 37 and are clamped together at 67.

The casing 10 is provided near its top with an opening 68 with which the neck 44 of drum 35 is registrable as shown in Figure 1. Opening 68 is rimmed by a neck 69 which is outwardly flanged and cooperable with a closure member or cover 70 hinged at 71, latch means as at 72 being provided for securing the cover in closing relation. At its lower end drum portion 36 has an opening 73 with which neck 44 is registrable, this opening having a closure member 74 which is arranged in the same manner as the closure member 70.

Casing portion 12, as here shown, is provided with top and bottom openings 75 and 76 normally closed by removable closure means 77 and 78. Let into the upper part of casing portion 12 is a mercury gauge 79. Also led into the casing portion 12 is a connection 80 from any suitable source of reduced pressure, not shown. The vacuum producing means may be a conventional pump, but since only relatively small vacuumizing capacity is ordinarily required, a stem jet evacuator of small capacity may be conveniently used.

The apparatus as thus far described is well adapted for dehydration of a solution to a point where the solution is still in such a fluid state that skin formation is substantially absent. With the neck 44 registering with opening 68 as shown in Figure 1, cover 70 is swung back, plug 47 removed and the material is introduced in quantity such that its level will be well below the tubular member 41. Plug 47 is then replaced and cover 70 closed, openings 73, 75 and 76 being also closed. Suction is now applied to the casing from the connection 80 and the drum is rotated through sprocket 34. Vapor is withdrawn from the pool in the bottom of the drum and from the film which is continuously derived from the pool as the drum rotates and passes out through member 41 and into contact with the desiccant for sorption thereby. If the desiccant is one such as silica gel, mechanical condensation of the vapors takes place with consequent generation of heat. In the case of a chemical desiccant, calcium sulphate for example, the vapors will be absorbed with a resultant heat of reaction. In any event the vapors have ready access to the desiccant through the screens 65 and 66 and the members 64 which are formed of metal having good heat conducting properties, the members themselves being in good heat transferring connection with the metal drum. The heat generated in the desiccant is transferred directly by the latter and by elements 64 to the drum and the capacity of the desiccant is so related to the capacity of the drum that an above freezing temperature will be maintained in the latter while the desiccant will be maintained at an efficient substantially constant operating temperature. Any substantial rise in temperature adversely affects the efficiency of the desiccant, particularly when it is of the mechanical condensation type, as silica gel, and the heat transfer is therefore of great benefit in preventing undue rise of the temperature in the desiccant while at the same time it maintains the material in the evaporating zone at an above freezing temperature.

The material may be poured in liquid form through the charging openings or it may be introduced in the form of pre-frozen chunks. In the frozen condition the gases such as carbon dioxide are quickly released, in the absence of frothing which otherwise occurs during such release, and the material then thaws as the result of heat transfer from the desiccant.

When dehydration has been carried out to the desired degree, the drum is turned to bring the neck 44 into register with opening 73, cover 74 is opened and plug 47 is removed so that the still fluid material will drain out and can be caught below opening 73. Or, if desired, the neck 44 can be registered with opening 68 and a suction nozzle inserted to withdraw the product.

When it becomes necessary to reactivate the desiccant, steam may be supplied to the coils from line 33 and covers 70 and 74 will preferably be opened to permit circulation. Or, covers 77 and 78 may be removed and hot air circulated from opening 75 to opening 76 or vice versa.

Figure 2:
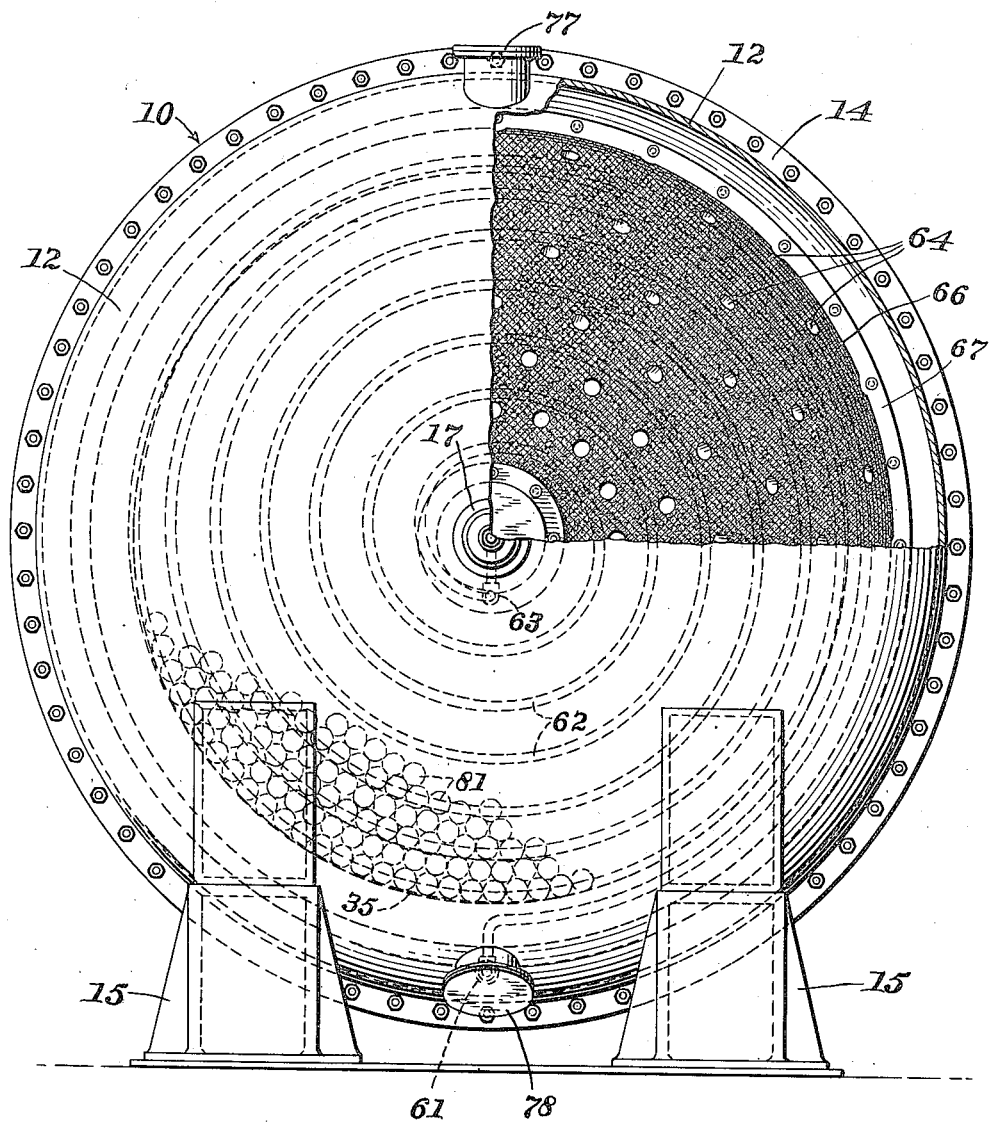
Figure 2 is an elevation, broken away in part, of the apparatus.

If dehydration is to be carried out to such a degree as to remove the water completely, then we provide in the drum 35 a body of balls or the like 81 in quantity such that in the condition of repose shown in Figure 2 the upper portion of the body will be above the level of the solution in the drum, the solution being in such a viscous condition that a surface skin will form. As the drum is rotated the film of viscous material tends to thicken and thus insulate the interior of the drum from the heat generated in the desiccant. However, as the drum is rotated, the balls 81 slide, roll and tumble, and due to their rubbing or scraping action on the film they not only disrupt the surface skin, but also act to detach undue film thickness from the drum walls. Also, since the body of tumbling media extends above the level of the pool or batch of solution in the bottom of the drum, the solution is agitated in such a manner as to break the surface skin and thereby permit the escape of vapors which would otherwise be trapped. Due to a grinding action exerted by the balls on each other they tend to clear themselves as well as the drum walls of adherent material. When a condition of dryness is reached, the balls serve to break the hardened film from the drum walls and from each other so that upon continued rotation of the drum a powdered residue will be present in the bottom of the drum. This and the balls can be pulled out through the discharge opening 73, plug 47 being removed, or a suction pipe can be introduced through opening 68 to remove the powder while the balls are being stirred to release it.

The mercury gauge 79 is a convenient provision in that by observing it and noting when the two columns come to substantially the same level, the operator is advised that dehydration has been completed.

It will be understood that the described apparatus and procedure are susceptible of variations and that the invention extends to all such as come within the following claims.

We claim:

1. Dehydrating apparatus comprising a fluid-tight casing, aligned bearings in opposite walls of the casing, a shaft mounted in said bearings with its ends projecting outwardly thereof, axial bores in said ends, said bearings including means forming a fluid-tight seal with said shaft, a drum fixed on said shaft within said casing in spaced relation thereto and adapted to receive the material to be dehydrated, an opening in the drum whereby the drum interior is placed in communication with the space between the casing and drum, a suction connection to the casing, a body of desiccant carried by said drum on its exterior, and an activating coil for said desiccant carried by said drum, the ends of said coil being connected into said bores respectively.

2. Dehydrating apparatus comprising a chamber, a drum rotatable in said chamber on a horizontal axis and having end walls so that a batch of the material to be dehydrated can be contained in the bottom portion of the drum and a film of the material will be carried on the inner surfaces of the drum above the batch when the drum is rotated, self-clearing means in said drum acting during rotation of the latter to detach adherent material from the drum walls, a free passage between the interiors of the drum and chamber, a layer of desiccant surrounding the drum and exposed to the atmosphere in the chamber, and a suction connection to said chamber.

3. Dehydrating apparatus comprising a chamber, a drum rotatable in said chamber on a horizontal axis and having end walls so that a batch of the material to be dehydrated can be contained in the bottom portion of the drum and a film of the material will be carried on the inner surfaces of the drum above the batch when the drum is rotated, tumbling media in the drum, a free passage between the interiors of the drum and chamber, a layer of desiccant surrounding the drum and exposed to the atmosphere in the chamber, and a suction connection to said chamber.

WALTER A. PATRICK, Jr.
JOHN D. ELDER.